(12) United States Patent
Imashiro et al.

(10) Patent No.: US 6,451,890 B1
(45) Date of Patent: Sep. 17, 2002

(54) POLYAMIDE RESIN COMPOSITION

(75) Inventors: Yasuo Imashiro; Naofumi Horie; Hiroyuki Kayaki, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/450,715

(22) Filed: Nov. 30, 1999

Related U.S. Application Data

(63) Continuation of application No. PCT/JP99/01600, filed on Mar. 29, 1999.

(30) Foreign Application Priority Data

Mar. 30, 1998 (JP) ........................................... 10-104043

(51) Int. Cl.⁷ ................................................ C08K 5/29
(52) U.S. Cl. ..................................................... 524/195
(58) Field of Search ......................................... 524/195

(56) References Cited

U.S. PATENT DOCUMENTS 4,101,699 A * 7/1978 Stine et al. .................. 428/36
4,987,168 A * 1/1991 Kerschbaumer ............ 524/195
6,013,340 A * 1/2000 Bonk et al. ................. 428/35.2

FOREIGN PATENT DOCUMENTS

| JP | 5-93056 A | 4/1993 |
| JP | 6-16933 A | 1/1994 |
| JP | 8-81533 A | 3/1996 |
| JP | 9-328609 A | 12/1997 |

* cited by examiner

*Primary Examiner*—Peter Szekely
(74) *Attorney, Agent, or Firm*—Kubovcik & Kubovcik

(57) ABSTRACT

There are provided a polyamide resin composition which alleviates the drawbacks of the prior art and which is improved in resistance to hydrolysis particularly in an acidic medium of high temperatures, oil resistance and metal halide resistance; and a member made from the above polyamide resin composition, which can be applied even to sites where the use of a metallic member has been necessary. The polyamide resin composition of the present invention comprises a polyamide resin and a carbodiimide compound and, owing to the use of the carbodiimide compound, is improved in hydrolysis resistance, oil resistance and metal halide resistance; and the member of the present invention is made from the above polyamide resin composition.

6 Claims, 7 Drawing Sheets

POLYAMIDE RESIN COMPOSITION

This application is a continuation of International Application PCT/JP99/01600 filed Mar. 29, 1999.

TECHNICAL FIELD

The present invention relates to a polyamide resin composition improved in water resistance, oil resistance and, metal halide resistance. More particularly, the present invention relates to a polyamide resin composition which, owing to the addition of an aliphatic carbodiimide compound, is improved in resistance to hydrolysis particularly in an acidic medium of high temperatures, oil resistance and metal halide resistance, as well as to a member made from the above polyamide resin composition, which is useful as an automobile part, an electric or electronic part, a machine part, a living article or an equipment for leisure time amusement, a building material, an industrial material or a packing material.

BACKGROUND ART

It has been known that polyamide resins are very stable in an alkaline medium but cause cleavage very easily in an acidic medium owing to acid-induced hydrolysis reaction and radical reaction.

To protect a polyamide resin from hydrolysis, there was proposed addition of an aromatic carbodiimide (see JP-A-6-16933).

In the above addition, however, there has been a drawback in that since the aromatic carbodiimide compound is generally a thermosetting resin, it causes self-crosslinking when it is melt-kneaded with a polyamide resin, lumps of crosslinked material of aromatic carbodiimide are formed in the polyamide resin, making insufficient the kneading.

In the above aromatic carbodiimide compound heretofore used, self-crosslinking is suppressed by introduction of a substituent into the molecule. However, it has been pointed out that since the self-crosslinking is prevented when heated, the decomposition of aromatic carbodiimide is promoted to invite the generation of decomposition gas and the resultant pollution of working environment and, therefore, the aromatic carbodiimide compound is unsuited for practical use.

Meanwhile, as members, used in, for example, automobile engines, wherein water resistance, oil resistance and metal halide resistance are main requirements, metallic members have been used. As such members, there are also used, in a large amount, members containing, as a base material, an aliphatic polyamide resin such as polyamide 6, polyamide 66, polyamide 46. or the like because these members are lightweight as compared with the metallic members and moreover have excellent mechanical properties.

The members containing, as a base material, an aliphatic polyamide resin, however, have had a problem in that when used in a high-temperature oil [for example, an automatic transmission fluid (hereinafter abbreviated to ATF), a brake fluid (hereinafter abbreviated to BF) or a long life coolant (hereinafter abbreviated to LLC)], the members have no sufficient resistance to oil, etc., deteriorate with time, and show significant reduction in strength.

The reason for the deterioration of the aliphatic polyamide resin in the above member is considered to be that when the member is used in, for example, an ATF, the ATF is first oxidized at a high temperature and increases its acidity and, in this acidic atmosphere of high temperature, the aliphatic polyamide resin undergoes thermal oxidation. Further, it cannot be neglected that, in the acidic atmosphere of high temperature, the aliphatic polyamide resin per se undergoes hydrolysis and thereby is deteriorated.

Thus, the upper temperature limit at which the member containing an aliphatic polyamide resin as a base material, used at sites contacting with an ATF is 120 to 130° C.; and use of a metallic member is necessary at a temperature range higher than that.

The members containing an aliphatic polyamide resin as a base material have also a problem in that, when they contact with a solution containing a metal halide (e.g. lithium chloride, lithium bromide, lithium iodide, sodium chloride, potassium chloride, magnesium chloride, calcium chloride, barium chloride, zinc chloride, barium iodide, iron chloride, aluminum chloride, nickel chloride or zinc iodide), the metal halide penetrates thereinto from the member surface, generating cracks (generally called stress cracks) on the member surface.

It has been investigated to use, in place of the aliphatic polyamide resin, so-called super-engineering plastics which are lightweight as compared with metallic members, are excellent in mechanical properties and are usable at higher temperatures, such as polyethersulfone (PES), polyphenylene sulfide (PPS), polyetherether ketone (PEEK) and the like. However, many of these super-engineering plastics are inferior in flexibility and expensive as compared with aliphatic polyamide resins; therefore, have found limited applications and are not yet in general practical applications.

In view of the above-mentioned drawbacks of the prior art, the present invention has been made with an aim of providing a polyamide resin composition improved in resistance to hydrolysis particularly in an acidic medium of high temperatures, oil resistance and metal halide resistance.

The present invention also aims at providing a member made from the above polyamide resin composition, applicable even to sites where use of metallic members has been necessary.

DISCLOSURE OF THE INVENTION

In order to achieve the above aims, the present invention provides a polyamide resin composition which comprises a polyamide resin and an aliphatic carbodiimide compound and, owing to the use of the aliphatic carbodiimide compound, is improved in hydrolysis resistance, oil resistance and metal halide resistance; and a member made from the above polyamide resin composition.

The present inventors made an intensive study in order to obtain a polyamide resin composition improved in resistance to hydrolysis particularly in an acidic medium of high temperatures, oil resistance and metal halide resistance. As a result, the present inventors found out that an excellent polyamide resin composition such as mentioned above can be obtained by adding, to a polyamide resin, an aliphatic carbodiimide compound (including a polycarbodiimide compound) having at least one carbodiimide group in the molecule and that a member made from the above polyamide resin composition shows stable mechanical strengths in contact with an ATF, a BF, a LLC or a metal halide. The finding has led to the completion of the present invention.

BEST MODE FOR CARRYING OUT THE INVENTION

Figure 1:
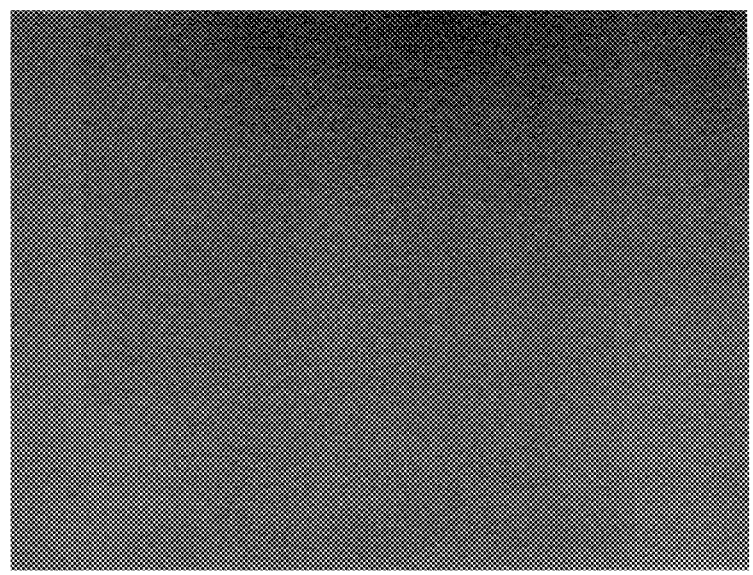
FIG. 1 is a photograph of the film of a polyamide resin (obtained by adding the carbodiimide of Synthesis Example 1 to a polyamide 6), taken in Reference Example 1.

The polyamide resin used in the present invention is preferably an aliphatic polyamide resin. It can be specifically exemplified by a polyamide 6 derived from ε-caprolactam; a polyamide 66 and a polyamide 46 derived from adipic acid /hexamehtylenediamine; a polyamide 12 derived from γ-lauryllactam, a polyamide 6/6T; a polyamide 6/6I, a polyamide 6T/6I and a polyamide 6/6T/6I (an aliphatic polyamide compound).

To the polyamide resin used in the present invention can be added a metal (e.g. copper or manganese) salt, an organic phosphorus (III) compound, a phenol type antioxidant, or an aliphatic or aromatic amine to impart a higher resistance to thermal oxidation in high-temperature atmosphere. The amount of the above compound added is 0.01 to 5 parts by weight per 100 parts by weight of the polyamide resin.

In the first invention, there is provided a polyamide resin composition which comprises a polyamide resin, particularly an aliphatic polyamide resin (e.g. polyamide 6, polyamide 66, polyamide 46, polyamide 12, or polyamide 6/6I, 6/6T, 6I/6T or 6/6I/6T) and an aliphatic carbodiimide compound and, owing to the use of the aliphatic carbodiimide compound, is improved in resistance to hydrolysis particularly in an acidic medium of high temperatures, oil resistance and metal halide resistance.

As the carbodiimide compound (including polycarbodiimide compound) having at least one carbodiimide group in the molecule, used in the present invention, there can be mentioned those synthesized by a generally well-known method. There can be mentioned, for example, those which can be synthesized by using, as a catalyst, 3-methyl-1-phenyl-2-phosphorene-1-oxide or the like or tetrabutyl titanate or the like and subjecting a polyisocyanate to a carbonic acid removal and condensation reaction at a temperature of about 70° C. or higher in a solvent-free state or in an inert solvent.

As the monocarbodiimide compound included in the above-mentioned carbodiimide compound, there can be mentioned for example, dicyclohexylcarbodiimide, diisopropylcarbodiimide dimethylcarbodiimide, diisobutylcarbodiimide, dioctylcarbodiimide, tert-butylisopropylcarbodiimide, diphenylcarbodiimide, di-tert-butylcarbodiimide and di-β-naphthylcarbodiimide. Of these, dicyclohexylcarbodiimide and diisopropylcarbodiimide are preferred in view of, in particular, the commercial availability.

As the polycarbodiimide compound included in the carbodiimide compound, there can be used polycarbodiimides produced by various methods. There can be used polycarbodiimides produced fundamentally by the conventional method for producing a polycarbodiimide [U.S.P. 2,941,956; JP-B-47-33,279; J. Org. Chem., 28, 2069–2075 (1963); Chemical Review 1981, Vol. 81, No. 4, pages 619–621].

In the above-mentioned method for producing a carbodiimide compound, as the organic diisocyanate which is a starting material for synthesis, there can be used, for example, aromatic diisocyanates, aliphatic diisocyanates, alicyclic diisocyanates and mixtures thereof, and specifically, there can be mentioned, for example, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane -1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl diisocyanate, and 1,3, 5-triisopropylbenzene-2,4-diisocyanate.

The carbodiimide compound produced using an aromatic isocyanate of the above organic diisocyanates is not preferable because it is generally a thermosetting resin, it causes self-crosslinking when it is melt-kneaded with a polyamide resin, and lumps of carbodiimide compound are formed in the polyamide resin, making insufficient the kneading.

Therefore, the carbodiimide compound used in the present invention is preferably a carbodiimide compound derived from an aliphatic isocyanate.

At the time of carbonic acid removal and condensation reaction of the organic diisocyanate, a compound (e.g. a monoisocyanate) reactive with terminal isocyanate of carbodiimide compound can be used to block the terminal of resulting carbodiimide, whereby a terminal-blocked carbodiimide compound having an appropriately controlled polymerization degree can be obtained.

As the monoisocyanate used for obtaining a terminal-blocked polycarbodiimide compound having a controlled polymerization degree, there can be mentioned, for example, phenyl isocyanate, tolyl isocyanate, dimethylphenyl isocyanate, cyclohexyl isocyanate, butyl isocyanate and naphthyl isocyanate.

The terminal-blocking agent used for obtaining a terminal-blocked polycarbodiimide compound having a controlled polymerization degree, is not restricted to the above-mentioned monoisocyanates and can be an active-hydrogen-containing compound reactive with isocyanate.

AS such an active-hydrogen-containing compound, there can be used, for example, aliphatic compounds, aromatic compounds or alicyclic compounds, each having —OH group (such as methanol, ethanol, phenol, cyclohexanol, N-methylethanolamine, polyethylene glycol monomethyl ether, polypropylene glycol monomethyl ether and the like), =NH group (such ad diethylamine, dicyclohexylamine and the like), —NH$_2$ group (such as butylamine, cyclohexylamine and the like), —COOH group (such as succinic acid, benzoic acid, cyclohexanoic acid and the like), —SH group (such as ethylmercaptan, allylmercaptan, thiophenol and the like), epoxy group, or the like.

The carbonic acid removal and condensation reaction of the above organic diisocyanate proceeds in the presence of a carbodiimidation catalyst. As the carbodiimidation catalyst, there can be used, for example, phosphorene oxides such as 1-phenyl-2-phsophorene-1-oxide, 3-methyl-1-phenyl-2-phosphorene-1-oxide, 1-ethyl-2-phosphorene-1-oxide, 3-methyl-2-phosphorene-1-oxide, 3-phosphorene isomers thereof and the like; and metal catalysts such as tetrabutyl titanate and the like. Among them 3-methyl-1-phenyl-2-phosphorene-1-oxide is suitable from the standpoint of reactivity.

The amount of the carbodiimide compound added is 0.01 to 20 parts by weight, preferably 0.01 to 18 parts by weight, more preferably 0.1 to 10 parts by weight per 100 parts by weight of the polyamide resin. When the amount is less than 0.01 part by weight, no effect of addition is seen. When the amount is more than 20 parts by weight, the properties of the aliphatic polyamide resin may be impaired.

In the present invention, mixing of the carbodiimide compound and the polyamide resin can be conducted by melt-kneading using an extruder or by adding the carbodiimide compound to the polyamide resin synthesized and mixing them.

To the polyamide resin can be added, as necessary, a reinforcing agent (e.g. a glass fiber, a carbon fiber or a metal fiber), an inorganic or organic filler, a stabilizer, an ultraviolet absorber, a lubricant, a wax, a coloring agent, a crystallization accelerator, etc. in order to enhance the mechanical strengths and heat resistance.

The amount of the reinforcing agent added is not restricted but is desirably 5 to 60 parts by weight. When the amount of the reinforcing agent is 5 parts by weight or less, the effect of addition of the reinforcing agent is not exhibited sufficiently and no sufficient improvement in mechanical strengths is obtained. When the amount of the reinforcing agent is more than 60 parts by weight, there is a fear that, for example, the molded article has low flexibility and generates cracks.

In the second invention, using the above-mentioned polyamide resin composition improved in resistance to hydrolysis particularly in an acidic medium of high temperatures, oil resistance and metal halide resistance, a member is formed which is usable in applications contacting with an ATF, a BF, a LLC or a metal halide, whereby the polyamide resin of which member is lighter than metallic members and excellent in mechanical properties finds wider applications.

In the present invention, as the method for forming a member from the polyamide resin, there can be mentioned, for example, various molding methods such as press molding, extrusion molding, injection molding, blow molding and the like.

As the member made from the polyamide resin composition of the present invention, there can be mentioned, for example, members contacting with an ATF, such as thrust washer, oil strainer, rotation sensor, step motor, terminal assembly, bearing holder, governor gear, worm gear, accumulation piston, control valve, stator, sprue valve, torque converter turbine and the like; members contacting with a BF, such as reservoir piston, solenoid valve, seal ring, tappet, master cylinder piston, pressure switch, proportion valve and the like; members contacting with a LLC, such as radiator tank and the like; and members contacting with a metal halide, such as wheel speed sensor, ABS-made ECU cover, inhibitor switch, vacuum tank, clamps, locker cover, alternator fan, intake manifold, link, member, engine mount, differential-mounting member, stabilizer linkage, compression rod, member insulator and the like.

The present invention is described more specifically below by way of Examples.

Synthesis of Carbodiimide Compounds

Synthesis Example 1

There were reacted, at 180° C. for 48 hours, 590 g of. 4,4'-dicyclohexylmethane diisocyanate, 62.6 g of cyclohexyl isocyanate and 6.12 g of a carbodiimidation catalyst (3-methyl-1-phenyl-2-phosphorene-1-oxide), to obtain 4,4,'-dicyclohexylmethanecarbodiimide (polymerization degree=10).

Synthesis Example 2

There were reacted, at 180° C. for 12 hours, 590 g of 4,4'-dicyclohexylmethane diisocyanate and 5.9 g of a carbodiimidation catalyst (3-methyl-1-phenyl-2-phosphorene-1-oxide). 62.6 g of cyclohexylamine was added, and a polycondensation reaction was allowed to take place until the peak derived from isocyanate group disappeared in infrared absorption spectrum (hereinafter abbreviated to IR), to obtain a cyclohexylurea-terminated 4,4'-dicyclohexylmethanecarbodiimide (polymerization degree=8).

Synthesis Example 3

549 g of m-tetramethylxylylene diisocyanate (TMXDI), 49.5 g of n-butyl isocyanate and 6.0 g of a carbodiimidation catalyst (3-methyl-1-phenyl-2-phosphorene-1-oxide) were subjected to a polycondensation reaction at 180° C. for about 48 hours until the peak derived from isocyanate group disappeared in IR, to obtain a butyl-terminated m-tetamethylxylylenecarbodiimide (polymerization degree=10).

Synthesis Example 4

500 g of isophorone diisocyanate (IPDI), 62.6 g of cyclohexyl isocyanate and 5.639 g of a carbodiimidation catalyst (3-methyl-1-phenyl-2-phosphorene-1-oxide) were subjected to a polycondensation reaction at 180° C. until the peak derived from isocyanate group disappeared in IR, to obtain a cyclohexyl-terminated isophoronecarbodiimide (polymerization degree=10).

[Water Resistance Test]

EXAMPLES 1 to 11

As a polyamide resin, a polyamide 6 was used. It was dry-blended with one of the carbodiimides synthesized in Synthesis Examples 1, 2, 3 and 4 and other component in a combination shown in Table 1 and in given amounts. The blend was kneaded using a twin-screw extruder to produce pellets. The pellets were passed through an injection molding machine to form ASTM No. 1 dumbbells for use as specimens for strength measurment. The specimens were placed in steam of 120° C. and measured for tensile strength after various given periods of time. The tensile strength retentions obtained are shown in Table 2.

Comparative Examples 1 and 2

Treatment and measurement was made in the same manner as in Examples 1 and 2 except that no polycarbodiimide compound was used. The tensile strength retentions obtained are shown in Table 2.

TABLE 1

| | Amount added to polyamide resin (wt. %) | | | |
|---|---|---|---|---|
| | Carbodiimide compound | | Antioxidant | |
| Example 1 | Synthesis Example 1 | 2 | Not added | |
| Example 2 | Synthesis Example 1 | 2 | Copper iodide | 0.05 |
| Example 3 | Synthesis Example 2 | 2 | Copper iodide | 0.5 |
| Example 4 | Synthesis Example 3 | 2 | Copper iodide | 0.5 |
| Example 5 | Synthesis example 4 | 2 | Copper iodide | 0.5 |
| Example 6 | Synthesis Example 1 | 0.5 | Copper iodide | 0.5 |
| Example 7 | Synthesis Example 1 | 2 | Copper iodide | 0.5 |
| Example 8 | Synthesis Example 1 | 2 | Copper iodide | 0.1 |
| Example 9 | Synthesis example 1 | 2 | Copper iodide | 2.0 |
| Example 10 | Synthesis Example 1 | 2 | Phenol type | 0.5 |
| Example 11 | Synthesis Example 1 | 2 | Phenol type/ phosphorus type | 0.25/0.25 |
| Comparative Example 1 | Not added | | Not added | |
| Comparative Example 2 | Not added | | Copper iodide | 0.5 |

TABLE 2

| | Tensile strength retention (%) | | | | | | | |
|---|---|---|---|---|---|---|---|---|
| | 0 day | 5 days | 10 days | 15 days | 20 days | 25 days | 30 days | 35 days |
| Example 1 | 100 | 66 | 49 | 39 | 34 | 33 | 30 | 29 |
| Example 2 | 100 | 67 | 54 | 49 | 45 | 42 | 38 | 36 |
| Example 3 | 100 | 66 | 55 | 50 | 46 | 40 | 39 | 35 |
| Example 4 | 100 | 64 | 52 | 46 | 41 | 38 | 35 | 30 |
| Example 5 | 100 | 65 | 53 | 46 | 43 | 39 | 36 | 31 |
| Example 6 | 100 | 66 | 49 | 40 | 31 | 25 | 19 | |
| Example 7 | 100 | 67 | 52 | 45 | 39 | 36 | 32 | |
| Example 8 | 100 | 67 | 54 | 43 | 39 | 35 | 35 | 32 |
| Example 9 | 100 | 64 | 53 | 42 | 39 | 36 | 35 | 33 |
| Example 10 | 100 | 65 | 50 | 38 | 37 | 35 | 31 | 30 |
| Example 11 | 100 | 66 | 51 | 40 | 38 | 36 | 33 | 31 |
| Comparative Example 1 | 100 | 63 | 39 | 20 | | | | |
| Comparative Example 2 | 100 | 66 | 48 | 36 | 27 | 19 | | |

In Table 2, each blank space indicates that the specimen for strength measurement caused deformation or partial disintegration and the measurement became impossible.
Example 12.

The specimens produced in Example 1 were immersed in a citrate buffer solution (pH=4) at 100° C. and measured for tensile strength after various given periods of time. The tensile strength retentions obtained are shown in Table 3.

Comparative Example 3

Treatment and measurement were made in the same. manner as in Example 12 except that no carbodiimide compound was used. The tensile strength retentions obtained are shown in Table 3.

TABLE 3

| | Time (days) | | | | | | |
|---|---|---|---|---|---|---|---|
| | 0 | 5 | 10 | 15 | 20 | 25 | 30 |
| Example 12 | 100 | 98 | 96 | 90 | 87 | 78 | 77 |
| Comparative Example 3 | 10 | 96 | 92 | 75 | 64 | 51 | 28 |

It is clear from the above Tables 1 to 3 that the polyamide resin composition of the present invention is improved in resistance to hydrolysis particularly in an acidic medium of high temperatures.

Reference Example 1

Figure 2:
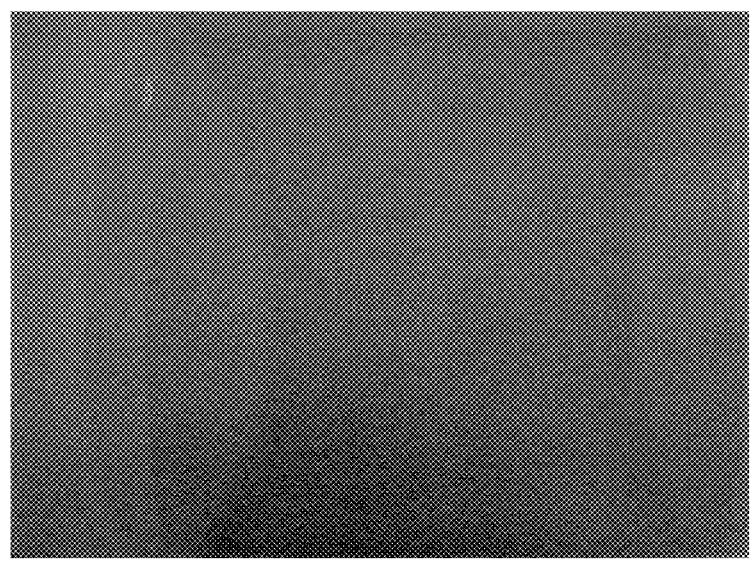
FIG. 2 is a photograph of the film of a polyamide resin (a polyamide 6), taken in Reference Example 1.

A polyamide 6 was used as a polyamide resin, and the carbodiimide synthesized in Synthesis Example 1 was added to the polyamide in an amount of 1.0 weight part. The mixture was dry-blended. The blend was kneaded using a twin-screw extruder at 270° C. and extruded through the T-die to produce a film. A picture of the film was taken, which is shown in FIG. 1. Also, a film was produced in the same manner except that no carbodiimide was added. A picture of the film was taken, which is shown in FIG. 2. It is clear from these pictures that the polyamide resin composition of the present invention contains no lump of carbodiimide compound and can be kneaded sufficiently.

Also when a polyamide 6 was used as a polyamide and the carbodiimide synthesized in Synthesis Example 2 or 3 was used, kneading could be conducted sufficiently without formation of any lump of carbodiimide compound (no picture is given for this case).

Reference Example 2

225 g of 4,4'-diphenylmethane diisocyanate and 23.8 g of phenyl isocyanate were dissolved in 2,240 g of tetrachloroethylene. Thereto was added 0.3 g of a carbodiimidation catalyst (3-methyl-1-phenyl-2-phosphorene-1-oxide). A polycondensation reaction was conducted at 80° C. until the peak derived from isocyanate group disappeared in IR, to obtain a phenyl-terminated 4,4'-diphenylmethanecarbodiimide (polymerization degree=10).

A polyamide 6 was used as a polyamide resin, and the carbodiimide synthesized above was added to the polyamide in an amount of 1.0% by weight based on the polyamide resin. The mixture was dry-blended. The blend was kneaded using a twin-screw extruder at 270° C. and extruded through the T-die to produce a film. A picture of the film was taken, which is shown in FIG. 3.

Figure 3:
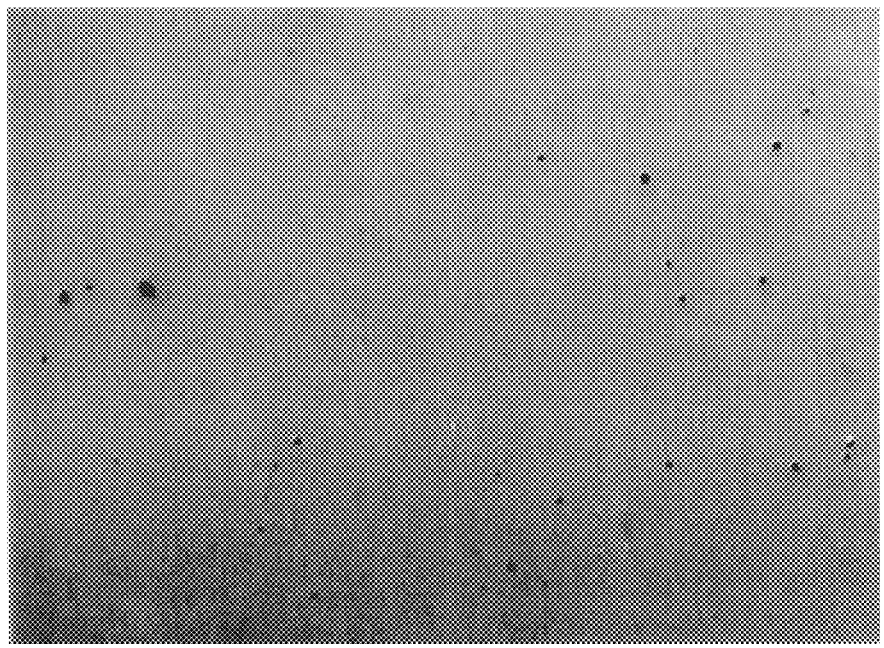
FIG. 3 is a photograph of the film of a polyamide resin (obtained by adding the carbodiimide of Reference Example 2 to a polyamide 6), taken in Reference Example 2.

It is clear from the picture shown in FIG. 3 that in the polyamide resin composition using the carbodiimide compound of Reference Example 2, the phenyl-terminated 4,4'-diphenylmetha necarbodiimide (which is an aromatic carbodiimide compound used in the conventional art) causes self-crosslinking by heat and the lumps of the resulting crosslinked material are present in the form of black spots, making kneading insufficient.

Reference Example 3

(1) Thermal Analysis of Carbodiimide Compound

Figure 4:
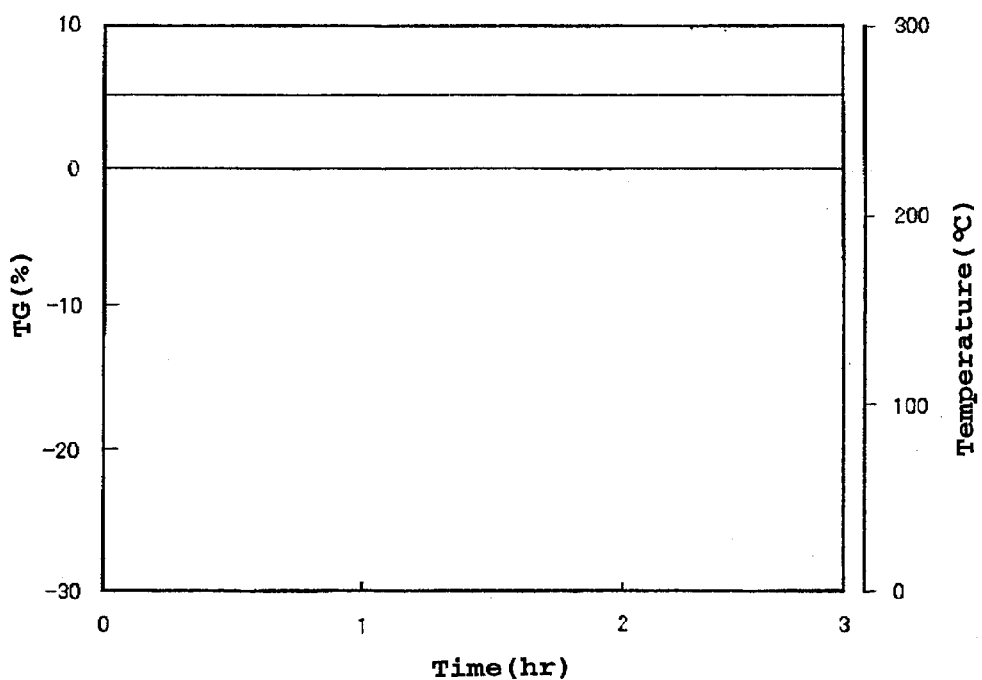
FIG. 4 is a chart of TG-DTA showing the result of thermal analysis of the carbodiimide compound of Synthesis. Example 1-1.
Figure 5:
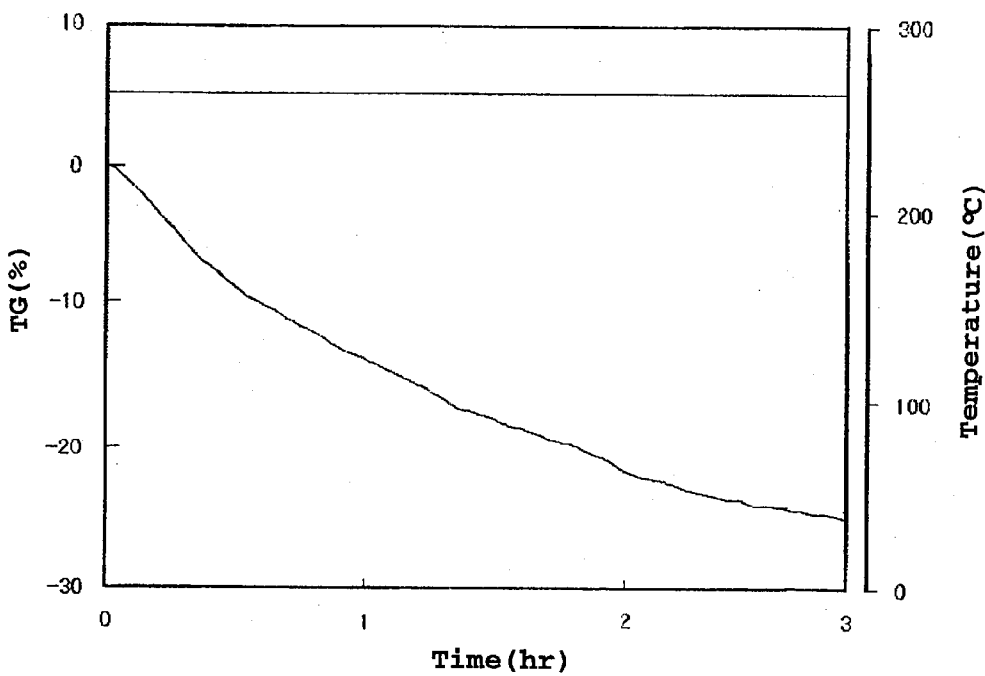
FIG. 5 is a chart of TG-DTA showing the result of thermal analysis of an aromatic carbodiimide compound.

The low-boiling material-removed carbodiimide compound obtained in the following Synthesis Example 1-1 and an aromatic carbodiimide compound used in a conventional art (see JP-A-6-16933) were subjected to thermal analysis by measuring their TG-DTAs using System 001 which is a thermal analyzer produced by MAC Science Co., Ltd. In the measurement, weight decrease was examined when a sample was kept at 270° C. for 60 minutes. The results are shown in FIG. 4 (the carbodiimide compound of Synthesis Example 1) and FIG. 5 (an aromatic carbodiimide compound used in a conventional art).

Synthesis Example 1-1

Synthesis of Low-boiling Material-removed Carbodiimide 590 g of 4,4'-dicyclohexylmethane diisocyanate (HMDI), 62.6 g of cyclohexyl isocyanate and 6.12 g of a carbodiimidization catalyst (3-methyl-1-phenyl-2-phosphorene-1-oxide) were subjected to a polycondensation reaction at 180° C. for about 48 hours until the peak derived from isocyanate group disappeared in IR. The reaction mixture was subjected to a vacuum of 10 to 20 mmHg for 2 hours to remove low-boiling materials, to obtain 4,4'-dicycohexylmethanecarbodiimide (polymerization degree= 10).

(2) Thermal Analysis of Carbodiimide Compound/ polyamide Resin Compositions

Figure 6:
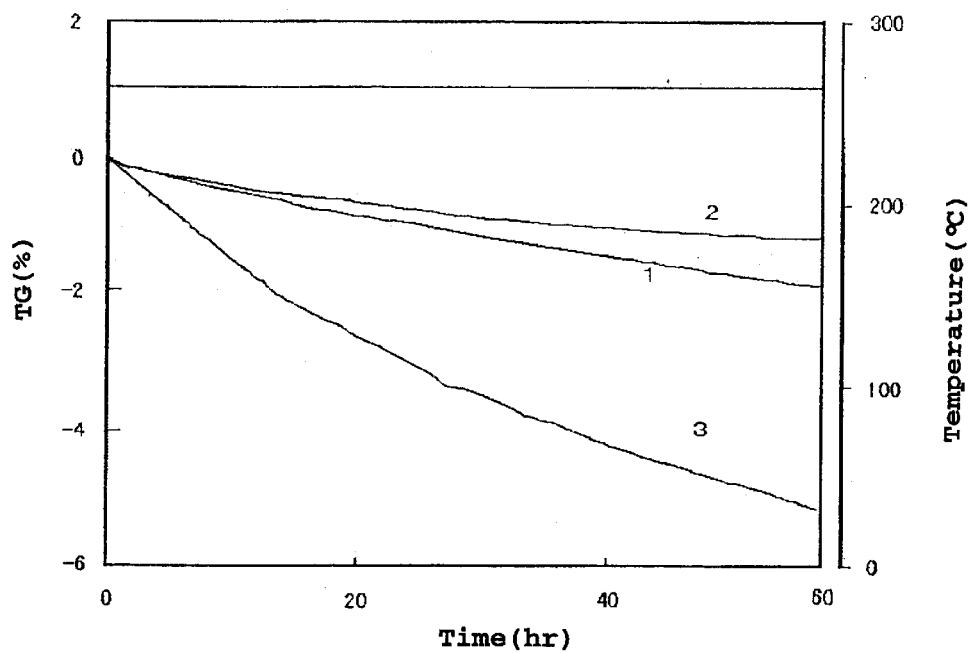
FIG. 6 is a chart of TG-DTA showing the results of thermal analysis of a polyamide resin and polyamide resin compositions.

The following polyamide resin or polyamide resin compositions were subjected to thermal analysis by measuring their TG-DTAs using System 001 which is a thermal analyzer produced by MAC Science Co., Ltd. In the measurement, weight decrease was examined when a sample was kept at 270° C. for 60 minutes. The results are shown in FIG. 6. Each numeral in FIG. 6 indicates the following polyamide resin or polyamide resin composition.

1: Polyamide 6

2: Polyamide 6 to which 5 parts of the carbodiimide compound of Synthesis Example 1-1 is added.

3: Polyamide 6 to which 5% of an aromatic carbodiimide compound used in a conventional art is added.

[Test for ATF Resistance]

EXAMPLES 13 to 19

Figure 7:
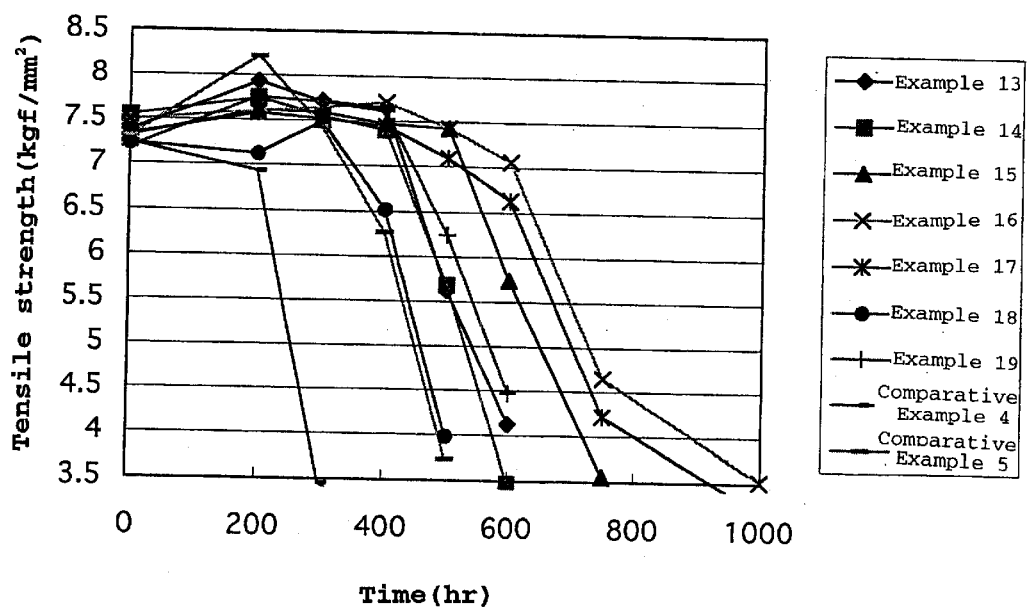
FIG. 7 is a graph showing the changes of tensile strength with time, of the strength measurement specimens (each as a member for automatic transmission) of Examples 13 to 19 and Comparative Examples 4 to 5.

To a polyamide 6 mixed with copper iodide to impart resistance to thermal deterioration was added the carbodiimide synthesized in Synthesis Example 1 or 2 in a given amount shown in Table 4. The mixture was dry-blended. The blend was kneaded using a twin-screw extruder to produce pellets. The pellets were passed through an injection molding machine to form ASTM No. 1 dumbbells. The dumbbells were used as strength measurement specimens for a member to contact with ATF. These specimens were immersed in an ATF of 160° C. and measured for tensile strength after various given periods of time. The results are shown in Table 5 and FIG. 7.

Comparative Example 4

Strength measurement specimens for a member to contact with ATF were formed in the same manner as in Examples 13 to 19 except that a polyamide 6 not mixed with copper iodide was used and no carbodiimide compound was used. The specimens were immersed in an ATF in the same manner as in Examples 13 to 19, and tensile strengths were measured after various given periods of time. The results are shown in Table 5 and FIG. 7.

Comparative Example 5

Strength measurement specimens for a member to contact with ATF were formed in the same manner as in Examples 13 to 19 except that no carbodiimide compound was used. The specimens were immersed in an ATF in the same manner as in Examples 13 to 19, and tensile strengths were measured after various given periods of time. The results are shown in Table 5 and FIG. 7.

TABLE 4

| | Carbodiimide | Amount of carbodiimide added | Addition of copper iodide |
|---|---|---|---|
| Example 13 | Synthesis Example 1 | 0.5 wt. % | Yes |
| Example 14 | Synthesis Example 1 | 1.0 wt. % | Yes |
| Example 15 | Synthesis Example 1 | 2.0 wt. % | Yes |
| Example 16 | Synthesis Example 1 | 5.0 wt. % | Yes |
| Example 17 | Synthesis Example 1 | 8.0 wt. % | Yes |
| Example 18 | Synthesis example 1 | 20.0 wt. % | Yes |
| Example 19 | Synthesis Example 2 | 2.0 wt. % | Yes |
| Comparative Example 4 | — | — | No |
| Comparative Example 5 | — | — | Yes |

TABLE 5

| | Time (hr) | | | | | | | |
|---|---|---|---|---|---|---|---|---|
| | 0 | 200 | 300 | 400 | 500 | 600 | 750 | 1000 |
| Example 13 | 7.37 | 7.93 | 7.72 | 7.65 | 5.62 | 4.12 | | |
| Example 14 | 7.54 | 7.75 | 7.55 | 7.4 | 5.68 | 3.46 | | |
| Example 15 | 7.31 | 7.61 | 7.59 | 7.47 | 7.42 | 5.74 | 3.55 | |
| Example 16 | 7.49 | 7.6 | 7.65 | 7.71 | 7.42 | 7.06 | 4.65 | 3.51 |
| Example 17 | 7.33 | 7.58 | 7.52 | 7.44 | 7.09 | 6.63 | 4.22 | 3.17 |
| Example 18 | 7.23 | 7.12 | 7.49 | 6.52 | 3.98 | | | |
| Example 19 | 7.18 | 7.76 | 7.71 | 7.61 | 6.24 | 4.47 | | |
| Comparative Example 4 | 7.24 | 6.93 | 3.45 | 2.91 | | | | |
| Comparative Example 5 | 7.31 | 7.5 | 7.43 | 6.26 | 3.73 | | | |

EXAMPLES 20 to 26

Figure 8:
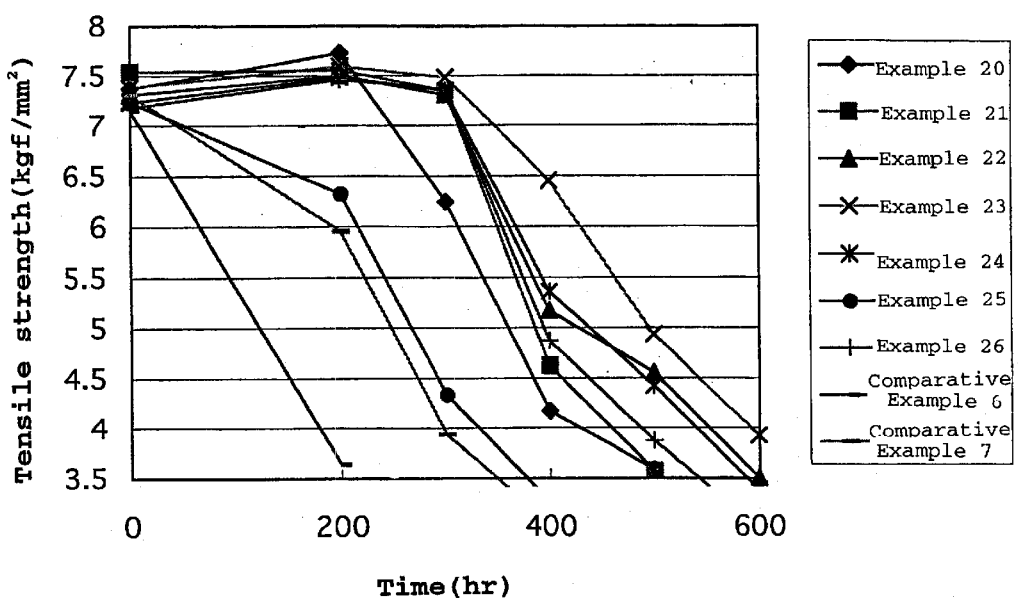
FIG. 8 is a graph showing the changes of tensile strength with time, of the strength measurement specimens (each: as a member for automatic transmission) of Examples 20 to 26 and Comparative Examples 6 to 7.

To a polyamide 6 mixed with copper iodide to impart resistance to thermal deterioration was added the carbodiimide synthesized in Synthesis Example 1 or 2 in a given amount shown in Table 6. The mixture was dry-blended. The blend was kneaded using a twin-screw extruder to produce pellets. The pellets were passed through an injection molding machine to form ASTM No. 1 dumbbells. The dumbbells were used as strength measurement specimens for a member to contact with ATF. These specimens were immersed in an ATF of 160° C. which had been sufficiently deteriorated by heating at 140° C. for 2,000 hours, and measured for tensile strength after various given periods of time. The results are shown in Table 7 and FIG. 8.

Comparative Example 6

Strength measurement specimens for a member to contact with ATF were formed in the same manner as in Examples 20 to 26 except that a polyamide 6 not mixed with copper iodide was used and no carbodiimide compound was used. The specimens were immersed in an ATF in the same manner as in Examples 20 to 26, and tensile strengths were measured after various given periods of time. The results are shown in Table 7 and FIG. 8.

Comparative Example 7

Strength measurement specimens for a member to contact with ATF were formed in the same manner as in Examples 20 to 26 except that no carbodiimide compound was used. The specimens were immersed in an ATF in the same manner as in Examples 20 to 26, and tensile strengths were measured after various given periods of time. The results are shown in Table 7. and FIG. 8.

TABLE 6

| | Carbodiimide | Amount of carbodiimide added | Addition of copper iodide |
|---|---|---|---|
| Example 20 | Synthesis Example 1 | 0.5 wt. % | Yes |
| Example 21 | Synthesis Example 1 | 1.0 wt. % | Yes |
| Example 22 | Synthesis Example 1 | 2.0 wt. % | Yes |
| Example 23 | Synthesis Example 1 | 6.0 wt. % | Yes |
| Example 24 | Synthesis Example 1 | 8.0 wt. % | Yes |
| Example 25 | Synthesis example 1 | 20.0 wt. % | Yes |
| Example 26 | Synthesis Example 2 | 2.0 wt. % | Yes |
| Comparative Example 6 | — | — | No |
| Comparative Example 7 | — | — | Yes |

TABLE 7

| | Time (hr) | | | | | | | |
|---|---|---|---|---|---|---|---|---|
| | 0 | 200 | 300 | 400 | 500 | 600 | 750 | 1000 |
| Example 20 | 7.37 | 7.72 | 6.24 | 4.17 | 3.58 | 2.71 | 2.34 | 1.98 |
| Example 21 | 7.54 | 7.55 | 7.35 | 4.62 | 3.57 | 2.92 | 2.13 | 1.89 |
| Example 22 | 7.31 | 7.5 | 7.3 | 5.17 | 4.55 | 3.5 | 2.75 | 2.23 |
| Example 23 | 7.38 | 7.59 | 7.48 | 6.45 | 4.93 | 3.92 | 3.15 | 2.56 |
| Example 24 | 7.23 | 7.48 | 7.35 | 5.36 | 4.42 | 3.38 | 2.51 | 2.04 |
| Example 25 | 7.23 | 6.32 | 4.33 | 3.25 | | | | |
| Example 26 | 7.18 | 7.46 | 7.36 | 4.87 | 3.87 | 2.99 | 2.52 | 2.11 |
| Comparative Example 6 | 7.15 | 3.64 | 2.31 | 2.41 | 2.16 | | | |
| Comparative Example 7 | 7.31 | 5.95 | 3.93 | 3.03 | 2.24 | 1.72 | 2.01 | 1.91 |

Incidentally, the ATF used in the tensile strength measurements in Examples 20 to 26 and Comparative Examples 6 and 7 had a decreased pH of about 4.5 and an increased viscosity of about 100 cp.

Generally, with respect to the life of polymer materials, it is possible to predict the life of a polymer material at a high temperature range by subjecting the polymer material to an accelerated deterioration treatment at a high temperature and deriving therefrom the exponential function of the polymer material; and a several-hour difference of life at high temperatures appears, in a temperature range of practical use, as a several-time difference of life.

[Test for BF Resistance]

EXAMPLES 27 to 29

Figure 9:
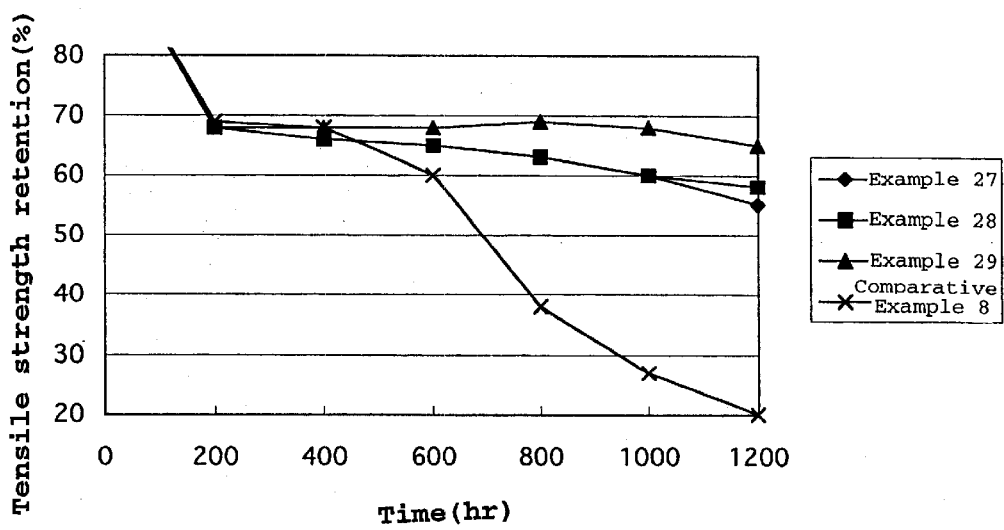
FIG. 9 is a graph showing the changes of tensile strength with time, of the strength measurement specimens (each as a member contacting with a BF) of Examples 27 to 29 and Comparative Example 8.

To a polyamide 6 mixed with copper iodide to impart resistance to thermal deterioration was added the carbodi-imide synthesized in Synthesis Example 1 in a given amount shown in Table 8. The mixture was dry-blended. The blend was kneaded using a twin-screw extruder to produce pellets. The pellets were passed through an injection molding machine to form ASTM No. 1 dumbbells. The dumbbells were used as strength measurement specimens for a member to contact with BF. These specimens were placed in a stainless steel-made pressure container. The container was filled with a mixed solution consisting of 90% by volume of a BF and 10% by volume of distilled water and tightly sealed. The container was heated to 120° C. and the specimens were measured for tensile strength after various given periods of time. The results are shown in Table 9 and FIG. 9.

Comparative Example 8

Strength measurement specimens were formed in the same manner as in Examples 27 to 29 except that no carbodiimide compound was used. The specimens were immersed in a brake fluid in the same manner as in Examples 27 to 29, and tensile strengths were measured after various given periods of time. The results are shown in Table 9 and FIG. 9.

TABLE 8

| | Carbodiimide | Amount of carbodiimide added | Addition of copper iodide |
|---|---|---|---|
| Example 27 | Synthesis Example 1 | 1.0 wt. % | Yes |
| Example 28 | Synthesis Example 1 | 2.0 wt. % | Yes |
| Example 29 | Synthesis Example 1 | 3.0 wt. % | Yes |
| Comparative Example 8 | — | — | Yes |

TABLE 9

| | Time (hr) | | | | | | |
|---|---|---|---|---|---|---|---|
| | 0 | 200 | 400 | 600 | 800 | 1000 | 1200 |
| Example 27 | 100 | 68 | 66 | 65 | 63 | 60 | 55 |
| Example 28 | 100 | 68 | 66 | 65 | 63 | 60 | 58 |
| Example 29 | 100 | 68 | 68 | 68 | 69 | 68 | 65 |
| Comparative Example 8 | 100 | 69 | 68 | 60 | 38 | 27 | 20 |

[Test for LLC Resistance]

EXAMPLE 30

Figure 10:
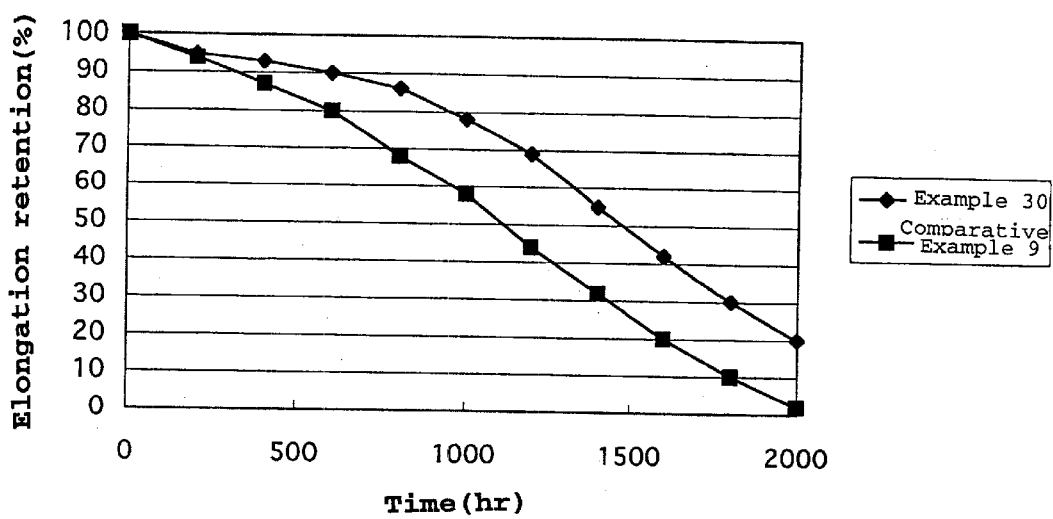
FIG. 10 is a graph showing the changes of tensile strength with time, of the strength measurement specimens (each as a member contacting with a LLC) of Example 30 and Comparative Example 9.

To a polyamide 6 mixed with copper iodide to impart resistance to thermal deterioration was added the carbodi-imide synthesized in Synthesis Example 1 in a given amount shown in Table 10. The mixture was dry-blended. The blend was kneaded using a twin-screw extruder to produce pellets. The pellets were passed through an injection molding machine to form ASTM No. 1 dumbbells. The dumbbells were used as strength measurement specimens for a member to contact with LLC. These specimens were placed in a stainless steel-made pressure container. The container was filled with a mixed solution consisting of 50% by volume of a coolant and 50% by volume of distilled water and tightly sealed. The container was heated to 110° C. and the specimens were measured for elongation after various given periods of time. The results are shown in Table 11 and FIG. 10.

Comparative Example 9

Strength measurement specimens were formed in the same manner as in Example 30 except that no carbodiimide compound was used. The specimens were immersed in a LLC in the same manner as in Example 30, and tensile strengths were measured after various given periods of time. The results are shown in Table 11 and FIG. 10.

TABLE 10

|  | Carbodiimide | Amount of carbodiimide added | Addition of copper iodide |
|---|---|---|---|
| Example 30 | Synthesis Example 1 | 3.0 wt. % | Yes |
| Comparative Example 9 | — | — | Yes |

TABLE 11

| | Time (hr) | | | | | | | | | | |
|---|---|---|---|---|---|---|---|---|---|---|---|
| | 0 | 200 | 400 | 600 | 800 | 1000 | 1200 | 1400 | 1600 | 1800 | 2000 |
| Example 30 | 100 | 95 | 93 | 90 | 86 | 78 | 69 | 55 | 42 | 30 | 20 |
| Comparative Example 9 | 100 | 94 | 87 | 80 | 68 | 58 | 44 | 32 | 20 | 10 | 2 |

[Test for Calcium Chloride Resistance]

EXAMPLES 31 to 32

To a polyamide 6 mixed with copper iodide to impart resistance to thermal deterioration was added the carbodiimide synthesized in Synthesis Example 1 in a given amount shown in Table 12. The mixture was dry-blended. The blend was kneaded using a twin-screw extruder to produce pellets. The pellets were passed through an injection molding machine to form ASTM No. 1 dumbbells. The dumbbells were used as specimens for surface observation, for a member to contact with calcium chloride.

TABLE 12

|  | Carbodiimide | Amount of carbodiimide added | Addition of copper iodide |
|---|---|---|---|
| Example 31 | Synthesis Example 1 | 2.0 wt. % | Yes |
| Example 32 | Synthetic Example 1 | 3.0 wt. % | Yes |
| Comparative Example 10 | — | — | Yes |

The above specimens were subjected to a two-cycle test, each cycle consisting of the following four steps (1) to (4):
(1) keeping at 90° C. in 95% R.H. for 1 hour,
(2) immersion in a saturated aqueous calcium chloride solution,
(3) drying at 100° C. for 1 hour, and
(4) cooling at room temperature for 1 hour.
Then, the cracks formed on the surface of each specimen were observed.

Comparative Example 10

Figure 11:
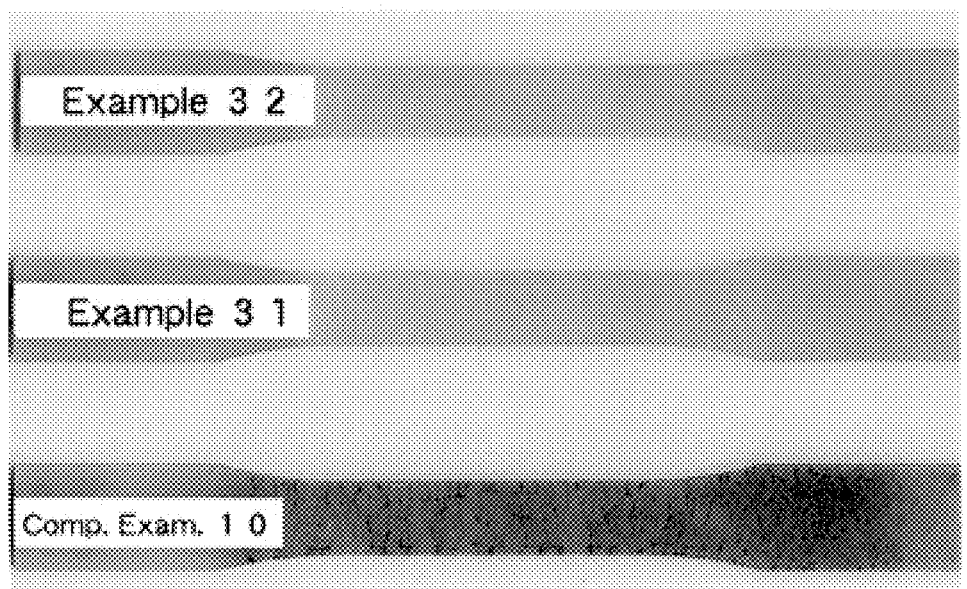
FIG. 11 is photographs of the specimens used in test for calcium chloride resistance, of Examples 31 to 32 and Comparative Example 10.

A specimen for surface observation was formed in the same manner as in Example 31 except that no carbodiimide compound was used. The specimen was subjected to the same cycle test using calcium chloride, as in Examples 31 and 32. The result is shown in FIG. 11.

INDUSTRIAL APPLICABILITY

As is clear from the above Examples and Comparative Examples, the polyamide resin composition of the present invention is improved in resistance to hydrolysis in acidic medium of high temperatures, oil resistance at high temperatures and metal halide resistance.

The improvement in resistance to hydrolysis in acidic medium of high temperatures is made possible by mixing a very small amount of an aliphatic carbodiimide compound to a polyamide resin, which is economical.

In the present polyamide resin composition, since it uses no aromatic carbodiimide compound, no lump of crosslinked material is formed and there arises no insufficient kneading; there is neither generation of decomposition gas such as aromatic carbodiimide nor subsequent weight decrease and, therefore, there is no pollution of working environment.

Being improved in resistance to hydrolysis in acidic medium of high temperatures, oil resistance at high temperatures and metal halide resistance, the polyamide resin composition of the present invention can be applied even to sites where use of a metallic member has been necessary.

What is claimed is:

1. A polyamide resin composition which comprises a polyamide resin, 0.1 to 10 parts by weight, per 100 parts by weight of the polyamide resin, of an aliphatic carbodiimide compound, and 0.01 to 5 parts by weight, per 100 parts by weight of the polyamide resin, of at least one kind of compound selected from the group consisting of copper salts, manganese salts, organic phosphorus compounds, phenol antioxidants, aliphatic amines and aromatic amines, and which, owing to the use of the aliphatic carbodiimide compound, is improved in hydrolysis resistance, oil resistance and metal halide resistance.

2. A component of an automatic transmission which contacts an automatic transmission fluid, said component being made from a polyamide resin composition set forth in claim 1.

3. A component of a brake system which contacts a brake fluid, said component being made from a polyamide resin composition set forth in claim 1.

4. A component of an automobile coolant system which contacts an automobile coolant, said component being made from a polyamide resin composition set forth in claim 1.

5. A component of an automobile which contacts a metal halide, said component being made from a polyamide resin composition set forth in claim 1.

6. A component of an automatic transmission which contacts an automatic transmission fluid, said component being made from a polyamide resin composition set forth in claim 2.

* * * * *